UNITED STATES PATENT OFFICE.

ANNA E. PARROTT, OF NORFOLK, VIRGINIA.

IMPROVED MEDICINE TO CURE CHOLERA, &c.

Specification forming part of Letters Patent No. 55,898, dated June 26, 1866.

*To all whom it may concern:*

Be it known that I, ANNA E. PARROTT, of Norfolk, Virginia, have invented an Improved Medicine to Cure Cholera, &c., of which the following is a specification.

This medicine is composed of extract of red-oak bark, cloves, alspice, cinnamon-bark, white ginger, mace, sugar, rye-whisky, laudanum, spirits of camphor, Hoffman's anodyne, and oil of peppermint.

Directions for the preparation of medicine for the cure of Asiatic cholera, chronic diarrhea, and dysentery: To two (2) gallons of rain or distilled water add four (4) pounds of the inside of red-oak bark, and boil in a china kettle until all the strength is extracted. Strain off the liquid, and to every quart add one (1) ounce pulverized cloves, one (1) ounce alspice, one (1) ounce cinnamon-bark, one (1) ounce white-ginger, one (1) ounce mace. Then boil for half an hour, or until the strength is thoroughly extracted. Strain the decoction, and to every gallon add three (3) pounds loaf-sugar and boil ten (10) minutes; allow to cool, and to the mixture add an equal quantity of best rye-whisky, and then to every quart add one (1) ounce laudanum, one (1) ounce spirits of camphor, two (2) ounces Hoffman's anodyne, and one (1) dram oil of peppermint.

What I claim is—

The medicine prepared substantially as herein described.

ANNA E. PARROTT.

Witnesses:
E. W. CALLAN,
S. C. FESSENDEN.